United States Patent Office 3,499,949
Patented Mar. 10, 1970

3,499,949
REACTION OF PEROXIDES WITH BLENDS OF POLYSTYRENE, RESINOUS BLOCK COPOLYMER, AND RUBBERY POLYMER OF AN OXIRANE
Clifford W. Childers and Jerry T. Gruver, Bartlesville, Okla., assignors to Phillips Petroleum Company, a corporation of Delaware
No Drawing. Filed Sept. 29, 1967, Ser. No. 671,559
Int. Cl. C08f 41/10, 41/12
U.S. Cl. 260—876                10 Claims

ABSTRACT OF THE DISCLOSURE

High impact polymer compositions formed by blending polystyrene, a resinous block copolymer of a monovinyl substituted aromatic compound and a conjugated diene, a rubbery polymer of an oxirane compound, a peroxy oxygen-containing material, and heating the blend to decompose the peroxy oxygen-containing material.

This invention relates to a new and improved method for making a high impact polymeric material and the product thereof.

Heretofore rubbery conjugated diene polymers have been added to polystyrene to improve the impact strength thereof.

It has now been found that polystyrene based polymeric materials having not only great impact strength but also excellent aging stability are formed by blending with polystyrene at least one resinous block copolymer formed from at least one conjugated diene and at least one monovinyl substituted aromatic compound, at least one rubbery homopolymer or copolymer of oxirane compounds, and at least one peroxy oxygen-containing material, and heating the resulting blend at a temperature and for a time sufficient to decompose the peroxy oxygen-containing material.

Thus, this invention relates to the above method for making the high impact polymeric material and also includes the high impact polymeric material produced by that method.

The polymer products of this invention are useful for making article carriers such as tote boxes, small appliance casings such as radio cabinets, plastic camera bodies, and the like.

Accordingly, it is an object of this invention to provide a new and improved high impact polymeric material.

It is another object of this invention to provide new and improved high impact polystyrene compositions.

It is another object of this invention to provide a new and improved method for making high impact polymeric materials such as high impact polystyrene based compositions.

Other aspects, objects, and advantages of this invention will be apparent to those skilled in the art from the following description and appended claims.

According to this invention there is provided a method for making polystyrene compositions which contain polystyrene present in the range of from about 40 to about 95, preferably from about 60 to about 90, weight percent; a resinous block copolymer formed from at least one conjugated diene and at least one monovinyl substituted aromatic compound, the block copolymer being employed in a range of from about 0.5 to about 20, preferably from about 1 to about 20, weight percent; a rubbery oxirane compound homopolymer and/or copolymer present in the range of from about 4.5 to about 39.5, preferably from about 9 to about 30, weight percent; all weight percentages being based on the total weight of the polymeric components in the blend composition; and at least one peroxy oxygen-containing material. The blend is then subjected to heating either during blending or after blending or both at a temperature at or above that which causes substantial decomposition of the peroxy oxygen-containing compound or compounds.

By resinous block copolymer what is meant is a block copolymer which contains at least 50 weight percent of one or more monovinyl substituted aromatic compounds based on the total weight of the block copolymer. By rubbery polymer of oxirane compound what is meant is a homopolymer of an oxirane compound as hereinafter defined or a copolymer of two or more alkene oxides as hereinafter defined which homopolymer or copolymer is elastomeric in nature and exhibits a reversible extensibility at 80° F. of at least 100 percent of the original length of the specimen with the retraction of at least 90 percent within one minute after release of a stress necessary to elongate the specimen to 100 percent.

Generally, any commercially available, general purpose polystyrene can be employed in this invention.

The resinous block copolymers employed in this invention can be prepared in any of the known methods of solution polymerization. The block structure is characterized in that the molecules of the final polymer product are composed of contiguous blocks or segments of different polymeric types, for example, one of the blocks forming the polymer chain can be a homopolymer of a conjugated diene or a copolymer of a conjugated diene and a monovinyl substituted aromatic compound while an adjacent block in that same polymer chain can be a homopolymer of a monovinyl substituted aromatic compound or a different copolymer of a monovinyl substituted aromatic compound and a conjugated diene. It should be noted that one or more conjugated dienes or monovinyl substituted aromatic compound blocks can be present in the block copolymers of this invention. The resinous block copolymers of this invention are high in monovinyl substituted aromatic compound and contain from about 50 to about 98, preferably from about 70 to about 90, weight percent monovinyl substituted aromatic compound based on the total monomers employed to make the block copolymer. The monovinyl substituted aromatic block of the block copolymer is resinous and contains from about 90 to about 100 weight percent monovinyl substituted aromatic compound, the remainder being substantially conjugated diene, while the conjugated diene block of this same copolymer contains from about 50 to about 100 weight percent conjugated diene, the remainder being substantially monovinyl substituted aromatic, both weight percentages being based upon 100 parts by weight of monomers in each block of the block copolymer. The amount of homopolymer of a monovinyl substituted aromatic compound present in a particular block copolymer can be determined by the oxidative degradation test which is based upon the principle that polymer molecules containing ethylenic bonds when dissolved in p-dichlorobenzene and toluene can be broken into fragments by reaction with tert-butyl hydroperoxide catalyzed with osmimum tetroxide. Saturated polymer molecules or molecular fragments such as polystyrene or the polystyrene units in block copolymers containing no ethylenic bonds remain unattacked. The small fragments (low molecular weight aldhehydes) and the low molecular weight polystyrene fragments from a random copolymer block are soluble in ethyl alcohol whereas the unattacked high molecular weight polystyrene from the styrene homopolymer block is insoluble in ethyl alcohol. It is thus possible to effect a separation of the high molecular weight polystyrene which constitutes the homopolymer block of the block copolymer.

The conjugated dienes that can be employed in preparing the copolymers applicable to this invention are those containing from 4 to 10 carbon atoms per molecule, for example, 1,3-butadiene, isoprene, 1,3-pentadiene (piperylene), 1,3-hexadiene, 2,3-dimethyl-1,3-butadiene, 1,3-octadiene, 4-ethyl-1,3-hexadiene, 4-phenyl-1,3-butadiene, and the like. Preferred conjugated dienes are butadiene, isoprene, and piperylene.

Monovinyl substituted aromatic compounds that can be employed for preparing the copolymers of this invention are those containing from 8 to 12 carbon atoms per molecule, for example, styrene, 3-methylstyrene, 4-methyl-styrene, 4-isopropylstyrene, 2,4-dimethylstyrene, 1-vinylnaphthalene, 2-vinylnaphthalene, and the like.

Solution-polymerized copolymers having block distribution of the monomers in the copolymer chain can be formed by polymerizing a first monomer in the presence of an organolithium catalyst to form a homopolymer, and subsequently adding a second monomer to the polymerization zone and continuing the polymerization operation. Block copolymers can also be formed by contacting a mixture of the selected conjugated diene and monovinyl substituted aromatic compound with an organolithium catalyst in the presence of a hydrocarbon diluent selected from the group consisting of aromatic, paraffinic and cycloparaffinic hydrocarbons. The polymerization is generally carried out at a temperature within the range of from about −20 to about 150, preferably from about −10 to about 80°C., and at pressures sufficient to maintain the materials present substantially in the liquid phase. The pressure will depend upon, inter alia, the particular materials being polymerized, the diluent being employed, and the temperature at which the polymerization is carried out. Pressures higher than autogenous can be employed if desired by the use of any suitable method such as the pressurization of the reactor with an inert gas.

The organolithium compounds used correspond to the formula $R(Li)_x$, wherein R is a hydrocarbon radical selected from the group consisting of aliphatic, cycloaliphatic, and aromatic radicals and $x$ is an integer from 1 to 4, inclusive. The aliphatic and cycloaliphatic radicals can be saturated or contain olefinic unsaturation. The R in the formula has a valence equal to the integer, and preferably contains from 1 to 20, inclusive, carbon atoms, although it is within the scope of the invention to use higher molecular weight compounds. Examples of these compounds include methyllithium,
isopropyllithium,
n-butyllithium,
tert-octyllithium,
n-decyllithium,
phenyllithium,
cyclohexyllithium,
4-butylcyclohexyllithium,
4-cyclohexylbutyllithium,
dilithiomethane,
1,4-dilithiobutane,
1,10-dilithiodecane,
1,20-dilithioeicosane,
1,4-dilithiocyclohexane,
1,4-dilithio-2-butene,
1,8-dilithio-3-decene,
1,4-dilithiobenzene,
1,4-dilithionaphthalene,
1,2-dilithio-1,3-diphenylethane,
9,10-dilithio-9,10-dihydroanthracene,
1,2-dilithio-1,3-diphenyloctane,
1,3,5-trilithiopentane,
1,5,15-trilithioeicosane,
1,3,5-trilithiocyclohexane,
1,2,5-trilithionaphthalene,
1,3,5-trilithioanthracene,
1,3,5,8-tetralithiodecane,
1,5,10,20-tetralithioeicosane,
1,2,4,6-tetralithiocyclohexane,
1,2,3,5-tetralithio-4-hexylanthracene,
1,3-dilithio-4-cyclohexene, and the like.

The amount of catalyst used in the preparation of block copolymers can vary over a wide range but will generally be at least 0.05 part by weight of the organolithium compound per 100 parts by weight of the total monomers to be polymerized in the process. The upper limit for the amount of organolithium used depends primarily upon catalyst solubility and the desired inherent viscosity of the polymer resulting from the polymerization. A preferred effective catalyst level is from about 0.1 to about 2 parts by weight of organolithium per 100 parts by weight of total monomers charged to the polymerization zone.

The hydrocarbon diluent employed can vary widely but is preferably a hydrocarbon of one of the above-mentioned types containing from 3 to 12, inclusive, carbon atoms. Examples of such diluents include propane, n-butane, isobutane, n-pentane, n-hexane, n-decane, n-dodecane, cyclohexane, cyclopentane, methylcyclohexane, benzene, toluene, xylene, and the like. Mixtures of two or more of these hydrocarbons can be employed.

Block copolymers prepared by using an organomonolithium initiator can be treated with a polyfunctional agent to terminate the polymerization and couple together two or more block copolymers.

Suitable methods of making block copolymers can be found in U.S. Patent 3,030,346, the disclosure of which is incorporated herein by reference. Other suitable methods of making block copolymers as well as random copolymers utilizable in this invention are found in U.S. Patent 2,975,160, the disclosure of which is incorporated herein by reference.

At the completion of the above polymerization reactions the reaction mixture is inactivated by the addition of one or more conventional catalyst-inactivating materials such as water, alcohols, organic and inorganic acids, and the like. Also, suitable additives such as antioxidants, stabilizers, pigments and the like can be added to the copolymer product.

The peroxy compounds which can be employed in this invention include organic and inorganic peroxides. The term "organic peroxides" is meant to include the hydroperoxides, unless otherwise stated, and to encompass compounds containing from 4 to 40 carbon atoms per molecule, inclusive. The organic peroxides can also be substituted with non-peroxy members such as halogen, hydroxy radicals, ether and/or ester linkages, and the like. The inorganic peroxides include calcium peroxide, barium peroxide, zinc peroxide, lead peroxide, and mixtures thereof.

Examples of suitable peroxides include: methyl n-propyl peroxide, diethyl peroxide, ethyl isopropyl peroxide, di-tert-butyl peroxide, di-n-hexyl peroxide, n-hexyl n-decyl peroxide, dieicosyl peroxide, dicyclohexyl peroxide, dicyclopentyl peroxide, bis(2,4,6-trimethylcyclohexyl) peroxide, bis(3,5-dichlorocyclohexyl) peroxide, bis(4-phenylcyclohexyl) peroxide, bis(2-cyclohexenyl) peroxide, bis (4-methyl-2-hexenyl) peroxide, bis(4-octenyl) peroxide, dipropionyl peroxide, dilauroyl peroxide, dibenzoyl peroxide, dicrotonyl peroxide, dibenzyl peroxide, dicumyl peroxide, methyl 2-n-propyl-3-butenyl peroxide, bis(alpha-ethylbenzyl) peroxide, bis[diisopropyl(4-isopropylphenyl) methyl] peroxide, bis[dimethyl - (4 - tert - butylphenyl) methyl] peroxide, benzyl alpha - methylbenzyl peroxide bis(4-chlorobenzoyl) peroxide, n-pentyl 5,8-diphenyldodecyl peroxide, bis (9,10-dihydroxydecyl) peroxide, 2,5-di(tert-butylperoxy)-2,5-dimethylhexane, bis(2-hydroxyheptyl) peroxide, tert-butyl hydroperoxide, dodecyl hydroperoxide, eicosyl hydroperoxide, triacontanyl hydroperoxide, 4 - methylcyclohexyl hydroperoxide, phenylcyclohexane hydroperoxide, 3-cyclohexenyl hydroperoxide, 3-phenyl-2-cyclohexenyl hydroperoxide, 4- cyclopentyl-n-butyl hydroperoxide, cumene hydroperoxide (dimethylphenylhydroperoxymethane), diisopropylbenzene hydroperoxide [dimethyl - (4 - isopropylphenyl) - hydroperoxymethane], (4-ethoxyphenyl)methyl hydroperoxide, di-n-hexyl-4-hydroxyphenylhydroperoxymethane, dimethyl 3-methoxyphenyl) hydroperoxymethane, peroxybenzoic acid, peroxybutyric acid, peroxydodecanoic acid, tert-butyl peroxybenzoate, di-tert-amyl diperoxyphthalate, and tert-dodecyl peroxyacetate.

Peroxides formed by the oxidation of terpene hydrocarbons such as pinane, alpha-pinene, p-menthane, and turpentine can also be used.

The peroxides which are preferred in this invention are those which decompose at a temperature of at least 250° F. The upper maximum decomposition temperature is dictated primarily by practicality rather than functionality, i.e. it should be such that substantially complete decomposition of the peroxide occurs during preparation of the composition. The amount of peroxy compound or compounds employed according to this invention is that which will provide from about 0.25 to about 6, preferably from about 0.35 to about 4.5 gram millimoles of peroxy oxygen (—O—O—) per 100 grams of conjugated diene in the above-described copolymer or copolymers.

The polymers of oxirane compounds useful in this invention are well known in the art. The polymers can be obtained commercially or made by any one of a number of techniques known in the art. The oxirane compound polymers of this invention are formed by polymerizing one or more oxirane compounds containing 2 to 20, preferably 2 to 8, carbon atoms per molecule, inclusive, represented by the formula

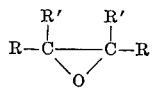

wherein R and R' are selected from a group consisting of hydrogen, saturated aliphatic, saturated cycloaliphatic, monoolefinic aliphatic, diolefinic aliphatic (conjugated and non-conjugated), monoolefinic cycloaliphatic, diolefinic cycloaliphatic (conjugated and non-conjugated), and aromatic radicals and combinations thereof such as aralkyl, alkaryl, and the like, preferably hydrogen, saturated aliphatic, saturated cycloaliphatic, monoolefinic aliphatic, and diolefinic aliphatic (conjugated and non-conjugated). Some or all of the R and R' radicals can be halogen-substituted, preferably with chlorine, and can contain oxygen in a form of an acyclic ether linkage (—O—) or an oxirane group of the formula

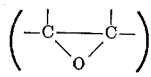

preferably an acrylic ether linkage. The oxirane compounds represented by the above formula can contain 1 or 2 olefinic linkages, 1 or 2 oxirane groups, and 0 to 1 ether linkages, preferably 1 olefinic linkage and 1 ether linkage. In addition, both R' radicals can represent a divalent aliphatic radical which, together with the carbon atoms of the oxirane group, can form a cycloaliphatic hydrocarbon nucleus containing from 4 to 10, preferably 4 to 8, carbon atoms.

Specific examples of some of the oxirane compounds which are within the above structural formula and which can be homopolymerized or copolymerized in accordance with this invention are ethylene oxide (epoxyethane); 1,2-epoxypropane (propylene oxide); 1,2-epoxybutane; 2,3-epoxybutane; 1,2-epoxypentane; 2,3-epoxypentane; 1,2-epoxyhexane; 3,4-epoxyhexane; 1,2-epoxyheptane; 2,3-epoxyoctane; 2,3-dimethyl-2,3-epoxypentane; 1,2-epoxy-4-methylpentane; 2,3-epoxy-5-methylhexane; 1,2-epoxy-4,4 - dimethylpentane; 4,5 - epoxyeicosane; 1 - chloro-2,3-epoxypropane (epichlorohydrin); 1-bromo-2,3-epoxypropane; 1,5 - dichloro - 2,3 - epoxypentane; 2 - iodo-3,4-epoxybutane; styrene oxide; 6-oxabicyclo-(3.1.0)hexane; 7-oxabicyclo(4.1.0)heptane; 3-n-propyl-7-oxabicyclo(4.1.0)heptane; bis(2,3-epoxybutyl)ether; tert-butyl 4,5-epoxyhepyl ether; and a 2-phenylethyl 3,4-epoxybutyl ether.

Unsaturated oxirane compounds within the above structural formula, including ethers, which can be homopolymerized or copolymerized with the saturated oxirane compounds include allyl 2,3-epoxypropyl ether (allyl glycidyl ether); allyl 3,4-epoxybutyl ether; 1-methallyl 3,4-epoxyhexyl ether; 3-hexenyl 5,6-epoxyhexyl ether; 2,6-octadienyl 2,3,7,8-diepoxyoctyl ether; 6-phenyl-3-hepenyl 3-ethyl-5,6-epoxyhexyl ether; 3,4-epoxy-1-butene (butadiene monoxide); 3,4-epoxy - 1 - pentene; 5-phenyl-3,4-epoxy-1-pentene; 1,2,9,10-diepoxy-5-decene; 6,7-di-n-butyl-3,4,9,10-diepoxy-1,11-dodecadiene; epoxy vinyl ether; allyl 2-methyl-2,3-epoxy-propyl ether; 3-cyclohexyl-2-propenyl 4-cyclohexyl-3,4-epoxybutyl ether; 2,4-pentadienyl 2,3-diethyl-3,4-epoxybutyl ether; 1-menthallyl 6-phenyl-3,4-epoxyhexyl ether; 5-(4-tolyl)2,3-epoxypentyl vinyl ether; bis[4-(3-cyclopentenyl)2,3-epoxybutyl] ether; 2-(2,4-cyclohexadienyl) ethyl 2,3-epoxybutyl ether; 2-(2,5-cyclohexadienyl) ethyl 2-benzyl-4,5-epoxypentyl ether; 3,4-epoxy-1,5-hexadienyl isopropyl ether; allyl 3,4-dimethyl-3,4-epoxy hexyl ether, 3,4 - epoxy - 4 - (2,3-dimethylphenyl)1-butene; 3,4-dimethyl - 3,4-epoxy-1-pentene; 5-(4-methylcyclohexyl)3,4-epoxy-1-pentene; 4,5-diethyl-4,5-epoxy-2,6-octadiene; 5-(2,4-cyclopentadienyl)1,2,6,7-diepoxyheptane; and 1-phenyl-1,2-epoxy-5,7-octadiene.

The oxirane compound homopolymers and copolymers of this invention can be made in accordance with the procedures and catalysts disclosed in Chemical Abstracts, vol. 60, column 1213a, or the Journal of Polymer Science, vol. 51, pages S7 through S10.

The polystyrene, resinous block copolymer, oxirane compound polymer and peroxy-containing compound or compounds can be mixed or blended together in any conventional manner, a primary desired result being an inert mixture of these components. It is presently preferred that the mixing, when the peroxy compound is present, be carried out in the substantial absence of air in order to effect maximum property improvement. However, it does not appear at present to be mandatory that substantially all air be excluded, for example, satisfactory results can be obtained by Banbury mixing if the Banbury is merely substantially full. Generally, any internal mixer such as a Banbuny, twin screw extruder, Brabender Plastograph, and the like can be employed. Mixing in a vacuum or an inert atmosphere such as nitrogen can also be advantageous employed in this invention. It should be noted that various blending techniques can be employed, e.g. blending only a portion of one or more components, preferably all the rubber components and a portion of the polystyrene, in a first mixing cycle and then adding the remainder of those one or more components, such as the remainder of the polystyrene, for additional mixing in a second mixing cycle.

Although the mixing temperature when the peroxy compound is present in the mix is that sufficient to substantially decompose the peroxy compound, in general, the mixing temperature will more times fall in the range of from about 250 to about 600, preferably from about 300 to about 500° F. The mixing time, as with the mixing temperature, can vary widely but will generally be in the range of from about 1 to about 30, preferably from about 2 to about 15, minutes. The blend can also be heated to similar temperatures after mixing is terminated or the heating operation can overlap the mixing period and the period following the termination of the mixing operation.

The blends of this invention can also contain other ingredien's normally included in such compounds. For example, antioxidants, pigments, dyes, fillers, stabilizers, plasticizers, and the like can be included in these blends.

As noted heretofore some high impact polystyrene compositions have been found to undergo a substantial amount of deterioration upon aging at an elevated temperature. Although the use of conventional antioxidants can deter the aging deterioration phenomenon, in many cases unduly large amounts, e.g. as much as 3 weight percent of antioxidant, are necessary in order to effect any substantial hindrance of such deterioration. By this invention substantial and very effective hindrance of such deterioration is obtained without the use of conventional antioxidants. However, it is still generally preferred to incorporate some antioxidant into the composition of this invention although only very small amounts of antioxidant are necessary to impart unusual aging stability. In many instances the compositions of this invention have excellent aging characteristics by themselves without the use of any additional antioxidant other than those normally employed in some of the polymeric components of the composition by the manufacture of those polymeric components. Thus, it is possible by this invention to form a high impact polymeric compositions without the deliberate addition of conventional antioxidants can be used in minor amounts in the polymeric compositions of this invention.

EXAMPLE I

A polystyrene composition was prepared according to the invention by blending a bead polymerized polystyrene (Cosden 550, a product of Cosden Oil and Chemical Company), a resinous 80/20 weight ratio of styrene/butadiene block copolymer, and a rubbery copolymer of about 91.5 weight percent propylene oxide and about 8.5 weight percent allyl glycidyl ether (a product of General Tire and Rubber Company designated as Dynagen XP-139), both weight percents being based on the total weight of the copolymer. The composition also contained bis(alpha, alpha-dimethylbenzyl) peroxide and a mixture of antioxidants, a phosphinated polyalkyl polyphenol [Table II, footnote 2, infra] and 2,6-di-tert-butyl-4-methylphenol. Blending was conducted in an internal mixer (Brabender Plastograph). The blending chamber was flushed with nitrogen and polystyrene was introduced and mixed at low speed until it fluxed. The block copolymer was then added followed by the propylene oxide/allyl glycidyl ether copolymer and mixing was continued 3 minutes under nitrogen with the mixer operating at 100 revolutions per minute (r.p.m.). The peroxide was then introduced, the vacuum head was closed, and the chamber was evacuated. Mixing was continued at 100 r.p.m. for 7 minutes. The vacuum was released, the antioxidant mixture was added, and mixing was continued 3 minutes in the presence of air.

The styrene/butadiene block copolymer employed in the composition was prepared in accordance with the following recipe:

TABLE I

| | |
|---|---|
| Styrene, parts by weight [1] | 80 |
| 1,3-butadiene, parts by weight [1] | 20 |
| Cyclohexane, parts by weight [1] | 460 |
| n-Butyllithium, mhm.[2] | 0.3 |
| Temperature, °F. | 150–200 |
| Time, hour | 1 |

[1] Based on total weight materials in the recipe.
[2] Gram millimoles per 100 grams monomers.

Cyclohexane was charged to the reactor first. The reactor was then purged with nitrogen and styrene was added followed by the butyllithium. The temperature was adjusted to 150° F. and the styrene was allowed to polymerize for 30 minutes. Butadiene was then introduced and polymerization was continued for 30 minutes. At the conclusion of the polymerization the polymer was recovered by coagulation in isopropyl alcohol. It was then separated and dried. During recovery steps approximately one part by weight per 100 parts by weight polymer of an antioxidant mixture containing equal parts by weight of a phosphinated polyalkyl polyphenol [Table II, footnote 2, infra] and 2,6-di-tert-butyl-4-methylphenol was added to the polymer. The block copolymer had a Mooney value (ML–4 at 212° F.) of about 75.

A control composition was prepared by blending polystyrene (Cosden 550), a 75-Mooney rubbery 75/25 weight ratio butadiene/styrene block copolymer, titanium dioxide, alpha,alpha-dimethylbenzylhydroperoxymethane, and a mixture of antioxidants. Blending was conducted in a Baker-Perkins Model UP–100 Ko-Kneader at a rate of 175 pounds per hour at about 450° F. temperature at 78 r.p.m. The antioxidant mixture was incorporated into the composition by extrusion in a single screw extruder.

The rubbery 75/25 butadiene/styrene block copolymer employed in the control composition was prepared in n-hexane diluent using n-butyllithium as the initiator. All ingredients were charged initially. Polymerization was initiated at about 150° F. and the temperature increased to about 225° F. during the reaction. On completion of the polymerization, 0.5 part by weight per 100 parts by weight rubber of a mixture of $C_{16}$ to $C_{18}$ saturated and unsaturated fatty acids was added to inactivate the catalyst and one part by weight per 100 parts by weight rubber of 2,4-di-tert-butyl-4-methylphenol was added as antioxidant. The mixture was steam stripped and the wet rubber crumb was washed and dried.

The composition prepared according to the invention and the control composition were each compression molded at 350° F. into sheets 1/16-inch in thickness. The sheets were cut into 1/2-inch strips from which dumbbell specimens were machined. A 2-inch gage length was used for the test specimens and the width in the gage length area was 1/4 inch. Tensile strength and elongation were measured at a drawing rate of 0.2 inch per minute. Izod impact strength was also measured. The samples were aged in air at 190° F. after which tensile strength, elongation, and Izod impact strength were determined again. The materials used in preparing the compositions and physical properties before and after aging were as follows:

TABLE II

| | Invention | Control |
|---|---|---|
| Polystyrene, parts by weight [1] | 60 | 75 |
| 75/25 styrene/butadiene block copolymer (resin), parts by weight [1] | 20 | |
| 75/25 butadiene/styrene block copolymer (rubber), parts by weight [1] | | 25 |
| Propylene oxide/allyl glycidyl ether copolymer (rubber), parts by weight [1] | 20 | |
| TiO$_2$, parts by weight [1] | | 1 |
| Bis (alpha, alpha-dimethylbenzyl) peroxide, parts by weight [1] | [3] 0.1 | |
| Alpha, alpha-dimethylbenzylhydroperoxymethane, parts by weight [1] | | [4] 0.022 |
| 2,6-di-tert-butyl-4-methylphenol, parts by weight [1] | 1.33 | 0.67 |
| Phosphinated polyalkyl polyphenol, parts by weight [1][2] | 0.67 | 1.33 |
| Properties, original: | | |
|   Tensile, p.s.i. | 2,800 | 3,110 |
|   Elongation, percent | 52 | 64 |
|   Notched Izod impact, ft. lbs./in. | 4.16 | 5.00 |
| Properties after aging in air at 190° F.: | | |
|   Tensile, p.s.i.: | | |
|     1 week | 2,910 | 3,110 |
|     2 weeks | 2,970 | 3,230 |
|     4 weeks | 2,960 | 3,240 |
|   Elongation, percent: | | |
|     1 week | 45 | 12 |
|     2 weeks | 33 | 6 |
|     4 weeks | 16 | 3 |
|   Retention of elongation, percent: | | |
|     1 week | 87 | 19 |
|     2 weeks | 63 | 14 |
|     4 weeks | 31 | 5 |

[1] Based on total weight of blend.
[2] A mixture of about 44 mole percent of an alkyl substituted triphenylphosphite and about 56 mole percent of an alkyl substituted phenol, the benzene rings having both mono- and dialkyl substitution with a total of 10 to 14 total alkyl carbon atoms per benzene ring.
[3] Equivalent to 7.4 gram millimoles of peroxy oxygen per 100 grams of butadiene in the blend.
[4] Equivalent to 7.7 gram millimoles of peroxy oxygen per 100 grams of butadiene in the blend.

These data show that the composition prepared according to the invention had much better aging stability, as evidenced by excellent retention of elongation after severe aging in air, than the control composition.

EXAMPLE II

A polystyrene composition was prepared according to the invention using the same procedure and materials in the same proportions given in Example I except that 0.284 part by weight of 2,6-di-tert-butyl-4-methylphenol and 0.142 part by weight of the phosphinated polyalkyl polyphenol [Table II, footnote 2, supra] were added as antioxidants instead of 1.33 parts and 0.67 part, respectively. These amounts were parts by weight per 100 parts by weight of total polymeric components. Reference can be made to Example I for control data. The results of tensile strength, elongation, and Izod impact strength before and after aging in air at 190° F. for 1 week were as follows:

TABLE III

Tensile, p.s.i.:
- Original _____ 2880
- Aged _____ 2980

Elongation, percent:
- Original _____ 55
- Aged _____ 44

Notched Izod impact, ft. lbs./in., original _____ 4.47
Retention of elongation, percent, after aging _____ 80

These data show that the composition prepared according to the invention had much better aging stability than the control (Example I). Furthermore, when preparing the composition according to the invention, only 0.426 part by weight of antioxidant mixture, based on 100 parts by weight of the total polymeric components, was added whereas the amount was 2 parts by weight in the control composition.

Tensile strength and elongation for Examples I and II were determined according to ASTM D-638-62T. Impact strength for Examples I and II was determined according to ASTM D-256-56 and reported as foot pounds per inch of notch, ⅛ inch bar.

Reasonable variations and modifications are possible within the scope of this disclosure without departing from the spirit and scope thereof.

That which is claimed is:

1. A process for making a high impact polymeric material comprising forming a blend of (1) polystyrene, (2) at least one block copolymer formed from at least one conjugated diene and at least one monovinyl substituted aromatic compound, said block copolymer containing from about 50 to about 98 weight percent monovinyl substituted aromatic compound based on the total weight of monomer used in preparing the block copolymer, (3) at least one of a rubbery homopolymer and a rubbery copolymer of alkene oxides of the formula

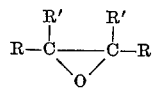

wherein R and R' are selected from the group consisting of hydrogen, saturated aliphatic, saturated cycloaliphatic, monoolefinic aliphatic, diolefinic aliphatic, monoolefinic cycloaliphatic, diolefinic cycloaliphatic, and aromatic radicals, halogen-substituted radicals of the foregoing type, and combinations thereof, and said radicals can contain oxygen in the form of an acyclic ether linkage (—O—) or an oxirane group

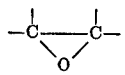

and said alkene oxide can contain 1 or 2 olefinic linkages, 1 or 2 oxirane groups, and 1 ether linkage, and both R' variables in said alkene oxide can represent a divalent aliphatic hydrocarbon radical which together with the oxirane group in said alkene oxide can form a cycloaliphatic nucleus, and (4) at least one peroxy oxygen-containing material, and heating said blend at a temperature and for a time sufficient to decompose the peroxy oxygen-containing material.

2. The method according to claim 1 wherein component (2) contains at least one monovinyl substituted aromatic block which contains from about 90 to about 100 percent monovinyl substituted aromatic compound based on the total weight of monomers used in preparing that block, and at least one conjugated diene block which contains from about 50 to about 100 weight percent conjugated diene based on the total weight of monomers used in preparing that block.

3. The method according to claim 1 wherein from about 0.25 to about 10 gram millimoles of peroxy oxygen per 100 grams of conjugated diene present in the blend is employed and the heating of the blend is carried out during at least either the forming of the blend or after the blend has been formed, and the heating temperature is at least 250° F.

4. The method according to claim 1 wherein the conjugated dienes employed have from 4 to 10 carbon atoms per molecule, inclusive, and the monovinyl substituted aromatic compounds employed have from 8 to 12 carbon atoms per molecule, inclusive.

5. The method according to claim 1 wherein component (3) is a copolymer of two alkene oxides of the formula of claim 1 wherein R and R' of that formula are one of hydrogen, saturated aliphatic, saturated cycloaliphatic, monoolefinic aliphatic, and diolefinic, one of said two alkene oxides has an R or R' radical which contains an acyclic ether linkage (—O—) and one olefinic linkage.

6. The method according to claim 1 wherein component (2) is a block copolymer of butadient and styrene, and component (3) is a copolymer of propylene oxide and allyl glycidyl ether.

7. The method according to claim 6 wherein component (1) is present in an amount of from about 40 to about 95 weight percent, component (2) is present in an amount of from about .5 to about 25 weight percent, and component (3) is present in an amount of from about 4.5 to about 39.5 weight percent, all weight percentages being based upon the total weight of the blend, and component (4) is present in an amount which will provide from about .25 to about 6 gram millimoles of peroxy oxygen per 100 grams of conjugated diene in the final blend, the peroxy oxygen-containing component being at least one of organic peroxides including hydroperoxides, the organic peroxides having from 4 to 40 carbon atoms per molecule, inclusive, and inorganic peroxides.

8. The method according to claim 7 wherein component (4) is bis(alpha, alpha-dimethylbenzyl) peroxide.

9. The product of claim 1.

10. The product of claim 7.

References Cited

UNITED STATES PATENTS 3,429,951  2/1969  Childers _____ 260—876
3,297,598  1/1967  Mills _____ 260—3

SAMUEL H. BLECH, Primary Examiner

C. J. SECCURO, Assistant Examiner

U.S. Cl. X.R.

260—45.95, 836